United States Patent [19]

Hojo et al.

[11] Patent Number: 5,426,259
[45] Date of Patent: Jun. 20, 1995

[54] METHOD FOR OIL-EXTRACTING TREATMENT OF WASTES

[75] Inventors: Kazuharu Hojo; Toshio Koguchi, both of Shizuoka, Japan

[73] Assignee: Hojo Co., Ltd., Shizuoka, Japan

[21] Appl. No.: 130,875

[22] Filed: Oct. 4, 1993

[30] Foreign Application Priority Data

| Oct. 20, 1992 | [JP] | Japan | 4-282079 |
| Oct. 26, 1992 | [JP] | Japan | 4-287753 |
| Feb. 16, 1993 | [JP] | Japan | 5-026486 |

[51] Int. Cl.⁶ .................................................. C07C 1/00
[52] U.S. Cl. ............................. 585/240; 585/241; 588/226; 588/228; 201/21; 201/23; 201/25; 201/27; 201/29; 208/400; 208/427
[58] Field of Search ............ 208/13, 106, 179, 184, 208/400, 427; 585/241, 240; 201/21, 23, 25, 29, 27; 588/226, 228

[56] References Cited

U.S. PATENT DOCUMENTS

| 2,705,697 | 4/1955 | Royster | 585/240 |
| 3,111,395 | 11/1963 | Sweeney | 208/427 |
| 3,112,255 | 11/1963 | Campion | 208/427 |
| 3,933,618 | 1/1976 | Patton | 208/427 |
| 4,235,675 | 11/1980 | Bechthold | 201/27 |
| 4,235,676 | 11/1980 | Chambers | 201/27 |
| 4,401,513 | 8/1983 | Brewer | 585/241 |
| 4,851,601 | 7/1989 | Fukuda et al. | 208/120 |
| 5,269,947 | 12/1993 | Baskis | 585/240 |

FOREIGN PATENT DOCUMENTS

0075060  3/1983  European Pat. Off. ............ 201/25

*Primary Examiner*—Asok Pal
*Assistant Examiner*—Walter D. Griffin
*Attorney, Agent, or Firm*—Kanesaka & Takeuchi

[57] ABSTRACT

In a method for oil-extracting treatment of wastes for extracting oil by heating wastes contained in a waste containing chamber in a manner to be shut off from air, an inert gas is injected into the waste containing chamber after termination of thermal decomposition of the wastes to force out the combustible gas within said waste containing chamber and said waste containing chamber is then opened, so as to prevent an explosion due to mixing of the residual combustible gas within the waste containing chamber and air after the termination of thermal decomposition of the wastes.

9 Claims, 6 Drawing Sheets

METHOD FOR OIL-EXTRACTING TREATMENT OF WASTES

BACKGROUND OF THE INVENTION

1. Field of the Invention

The present invention relates to a method for oil-extracting treatment of wastes and, more particularly, relates to a method for oil-extracting treatment of wastes in which the quality of safety is improved.

2. Description of the Related Art

Figure 6:
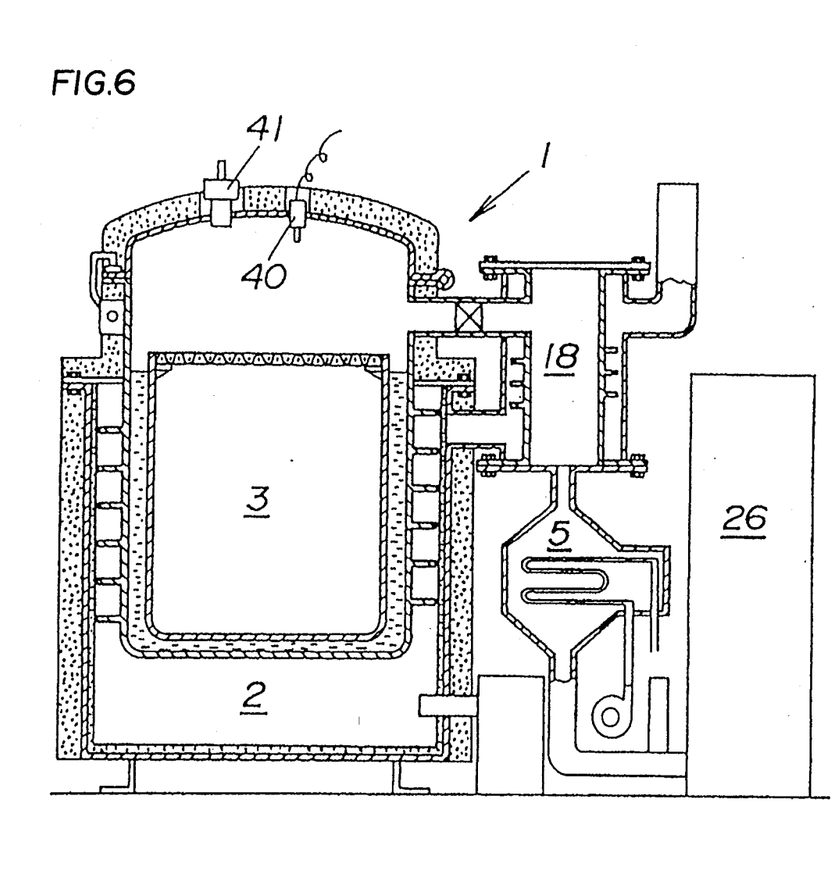
FIG. 6 schematically shows an oil-extracting waste treatment apparatus to which a prior art to the present invention is applied.

An apparatus for oil-extracting treatment of wastes is conventionally known to extract oil suitable for a fuel in such a manner as that rubber or wastes of thermoplastic high-molecular compounds, for example, is subjected to dry distillation under a catalyst. An apparatus for oil-extracting treatment of wastes as shown in FIG. 6, for example, may be considered as an oil-extracting waste treatment apparatus 1.

In the oil-extracting waste treatment apparatus 1, wastes are introduced into a waste containing chamber 3 which is provided within a combustion chamber 2 and the waste containing chamber 3 is heated from the outside.

The wastes are thermally decomposed due to such heating and generates a gas. The gas is formed into oil at a liquefying section 5 through a contact reactor 18 to be stored in an oil tank 26.

There is however a problem that, if, after termination of thermal decomposition of the wastes, the waste containing chamber 3 is opened without cooling the waste containing chamber 3, the residual combustible gas within the waste containing chamber 3 is brought into contact with air to cause an explosion.

SUMMARY OF THE INVENTION

It is an object of the present invention to provide a method for oil-extracting treatment of wastes where the problems in the prior art as described are mitigated.

It is another object of the present invention to provide a method for oil-extracting treatment of wastes in which occurrence of a crack within a waste containing chamber for example due to degradation of the constructing material is detected so as to prevent an explosion of the combustible gas within the waste containing chamber.

DESCRIPTION OF THE PREFERRED EMBODIMENTS

Figure 1:
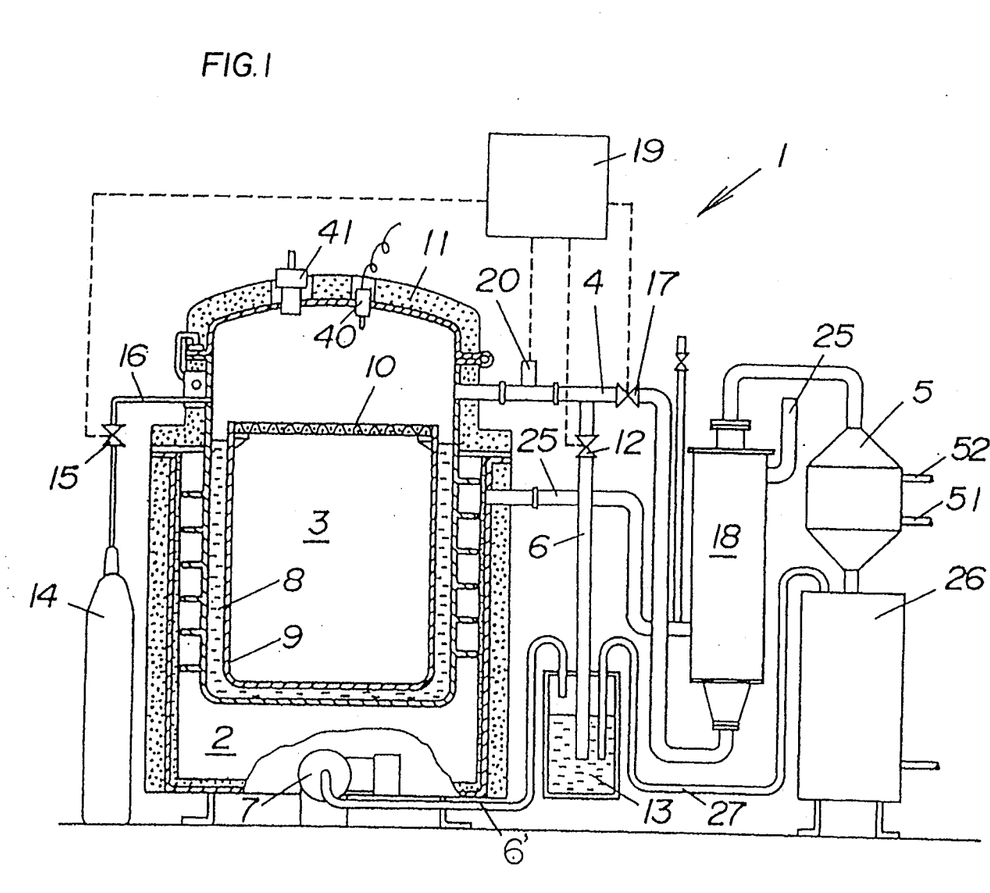
FIG. 1 schematically illustrates a waste treatment apparatus to which an embodiment of the present invention is applied.
Figure 2:
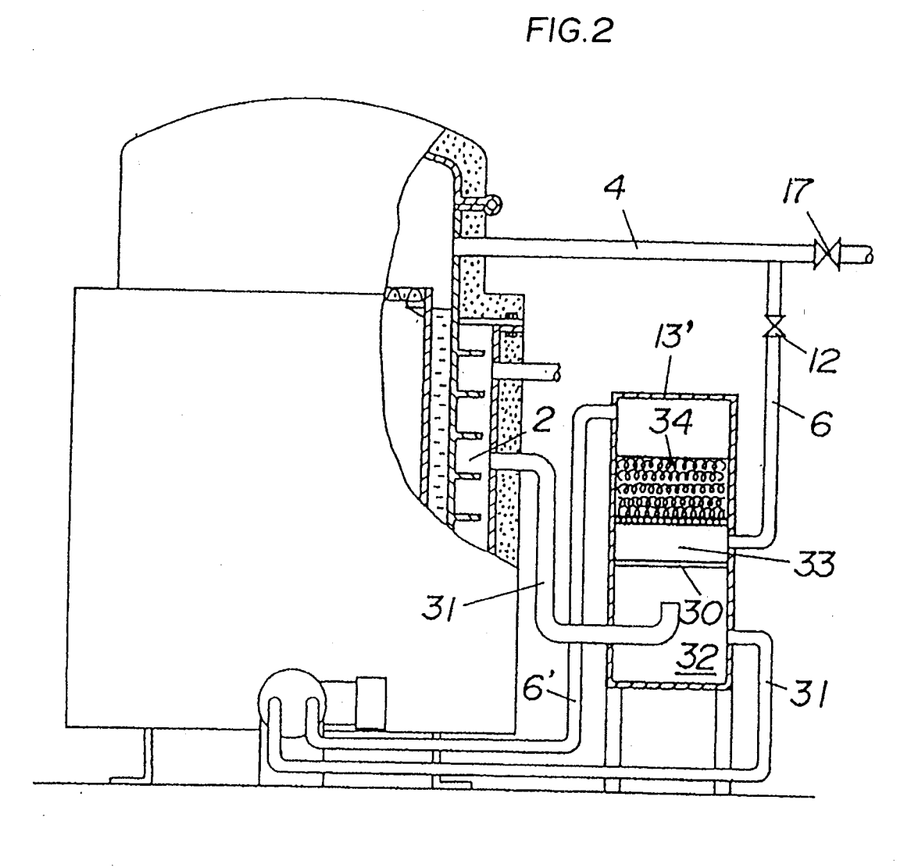
FIG. 2 schematically illustrates another example of the by-pass passage shown in FIG. 1.
Figure 3:
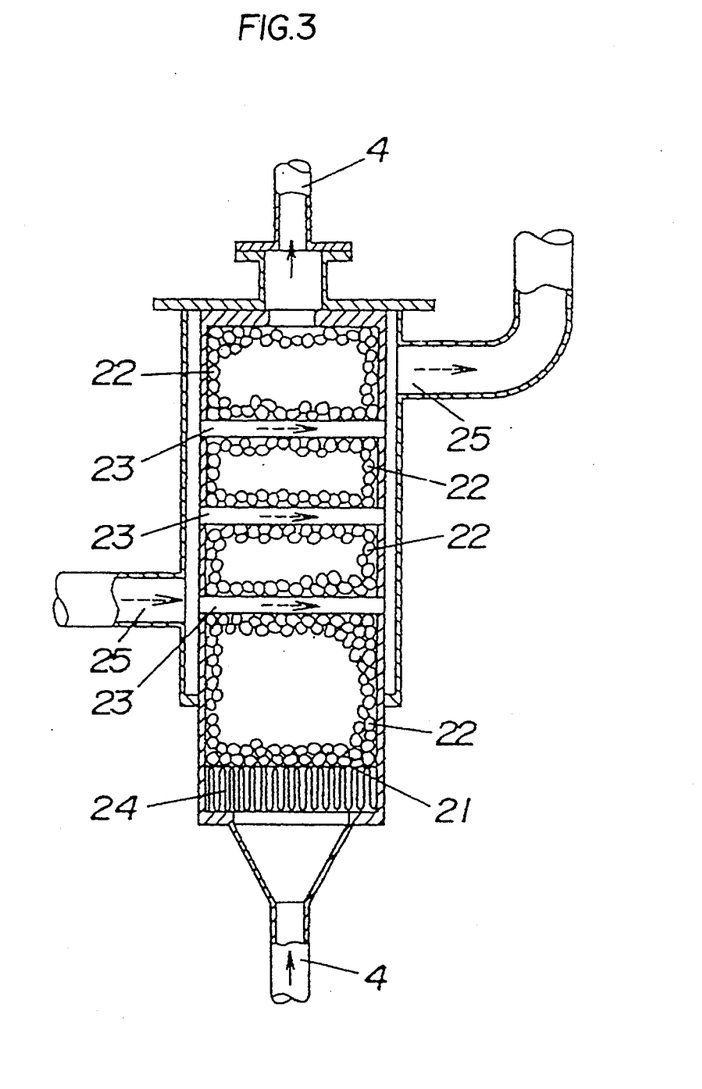
FIG. 3 is a partially sectional view schematically showing the catalytic reactor shown in FIG. 1.

An embodiment of the present invention will now be described with reference to the drawings. Referring to FIGS. 1 to 3, numeral 1 denotes an apparatus for oil-extracting treatment of wastes in which oil is extracted by heating the wastes contained in a waste containing chamber in a manner to be shut off from air. The oil-extracting waste treatment apparatus 1 includes: a combustion chamber 2; a waste containing chamber 3 provided within the combustion chamber 2 for containing wastes in a manner shut off from the combustion chamber 2; a gas introduction passage 4 for directing a gas generated within the waste containing chamber 3; a liquefying section 5 for liquefying the gas introduced through the gas introduction passage 4; and a by-pass passage 6 which branches from the gas introduction passage 4 and is connected to the combustion chamber 2.

The combustion chamber 2 has its casing formed for example of a steel and lined with a refractory material, and the outer surface of the casing is covered with a heat insulating member while a burner 7 is disposed at the lower portion thereof.

Here, the waste containing chamber 3 provided within the combustion chamber 2 is formed as a double furnace 9 (constructed by an outer furnace and an inner furnace consisting for example of a stainless steel) so that heat may be transmitted uniformly through heat medium oil (high-temperature oil) 8. A mixture of tin and copper at a ratio by weight of 1:1 may be used instead of the heat medium oil.

Wastes consisting of waste plastics (or waste oil, used tires, etc.) (not shown) are contained in the double furnace 9, and a kind of gas-liquid separator 10 (commercially known as SUS 304 DEMISTER, Product No. 3311 manufactured by Naniwa Mesh) formed as meshes of a stainless steel is provided at the upper portion of the inner furnace so that the gas component is directed to the gas introduction passage 4 by the gas-liquid separator 10.

An outer lid 11 is provided above the double furnace 9, and the outer lid 11 is tightened by means of a plurality of bolt and nut (not shown) so as to shut off the wastes from the open air. An auto-gas discharging valve 40 and a safety vale 41 are provided on the outer lid 11.

When heat is applied from the outside while shutting off air therefrom, the wastes contained in the double furnace 9 are thermally decomposed to generate a gas (such as $H_2$, $CO_2$, $CH_4$, $C_2H_4$, $C_3H_6$).

The gas may be guided through the gas introduction passage 4 of which one end is connected to the waste containing chamber 3.

The gas introduction passage 4 branches at a point in the course thereof and the branching portion forms a by-pass passage 6 and is connected to the combustion chamber 2 through by-pass passages 6, 6'.

A first closing valve 12 and a flashback prevention device 13 are provided in the course of the by-pass passage 6, and the other end of the by-pass passage 6' faces the suction side of an inlet fan (not shown) of the burner 7.

It should be noted that the flashback prevention device 13 prevents a backfire, for example, by means of water as shown in FIG. 1.

Although the one shown in FIG. 1 suffices as the flashback prevention device 13, the types of gas soluble in water are contained in the gas which passes through the by-pass passage 6. Since the gas is dissolved in water and, after a long time period of use, a large amount of combustible substance is contained in the flashback prevention device 13 where its primary function for preventing a flashback is lost, there is a disadvantage that water in the flashback prevention device 13 must be changed.

To eliminate this problem, a flashback prevention device 13' as shown in FIG. 2 may be used. A partition wall 30 is provided at the center of the flashback prevention device 13', and a passage 31 for applying heat to the partition wall 30 is opened at one end thereof to the combustion chamber 2 and in the course thereof to a lower chamber 32 of the partition wall 30 and the other end thereof faces the suction side of an inlet fan (not shown) of the burner 7.

Further, a wire-meshed section 34 for the prevention of a backfire is provided at the upper portion of an upper chamber 33 of the partition wall 30. It is opened at one end thereof to the gas introduction passage 4 and in the course thereof to the upper chamber 33 of the partition wall 30 and faces at the other end thereof the suction side of an inlet fan (not shown) of the burner 7.

In the flashback prevention device 13', since the partition wall 30 is heated due to the hot combustion gas which passes through the passage 31, it is possible to prevent liquefaction of a gas within the upper chamber 33.

Further, a cylinder 14 containing an inert gas such as $CO_2$ or $N_2$ is provided at the outside of the combustion chamber 2. The cylinder 14 and the waste containing chamber 3 are connected to each other through an inert gas passage 16 having a third closing valve 15.

The inert gas such as $CO_2$ or $N_2$ in the cylinder 14 is used to effect a gas purge. Here, the gas purge includes a first gas purge which is to be performed in the early burning process within the combustion chamber 2 and a second gas purge which is effected after termination of thermal decomposition of the wastes within the combustion chamber 2.

In the first gas purge, the third closing valve 15 is opened when, i.e. before switching the valves (from open to close of the first closing valve 12 and from close to open of a second closing valve 17) by a temperature sensor 20 in the early burning process in the combustion chamber 2, so as to force out the combustible gas in the by-pass passage 6 to the combustion chamber 2 and to a combustion gas discharging passage 25 by means of the inert gas such as $CO_2$ or $N_2$ in the cylinder 14.

In the second gas purge, operation of the burner 7 is stopped after termination of the thermal decomposition of the wastes within the combustion chamber 2. Prior to opening of the outer lid 11, the interior of the combustion chamber 2 is preferably subjected to spontaneous cooling by leaving it as it is for a predetermined time period (e.g., about 10 minutes) and the third closing valve 15 is then opened. (It is possible in some cases to open the third closing valve 15 without spontaneously cooling the interior of the combustion chamber 2.)

The inert gas such as $CO_2$ or $N_2$ in the cylinder 14 is then used so that the residual gas in the main passage for gases is purged by means of the inert gas.

That is, the inert gas is directed through the gas introduction passage 4, a contact reactor 18, the liquefying section 5, a gas returning tube 27, the suction side of an inlet fan (not shown) of the burner 7 (the by-pass passage 6'), and the combustion chamber 2 wherein the first closing valve 12 is closed and the second closing valve 17 is opened by closing valve control means 19. After being introduced to the combustion chamber 2, it is directed to the open air side through the combustion gas discharging passage 25.

Further, in the above described second gas purge, the combustion gas may be directly discharged to the outside of the waste containing chamber 3. Specifically, as shown in FIG. 1, an auto-gas discharging valve 40 is provided within the waste containing chamber 3 so that, when the pressure within the waste containing chamber 3 reaches a predetermined pressure, the auto-gas discharging valve 40 is opened by means of the inert gas such as $CO_2$ or $N_2$ in the cylinder 14 to force out the combustion gas within the waste containing chamber 3 to the open air side through the auto-gas discharging valve 40. Further, though not shown, a solenoid valve may be used instead of the auto-gas discharging valve 40, so as to open the solenoid valve after injection of the inert gas to force out the combustible gas within the waste containing chamber 3 to the open air side through the solenoid valve.

Here, the second valve 17 and the contact reactor 18 are provided in that order along the direction of the gas flow in the gas introduction passage 4, and the other end of the gas introduction passage 4 is connected to the liquefying section 5.

The second valve 17, the above described first valve 12 and the third valve 15 are controlled to be opened/closed by the closing valve control means 19.

Numeral 20 denotes a temperature sensor which is provided in contact with the outer surface of the gas introduction passage 4.

Further, the contact reactor 18 is formed for example as shown in FIG. 3 by placing a layer upon another of a catalyst (such as a porous zeolite 22) provided on wire meshes 21 made of a stainless steel. Tubes 23 for guiding the exhaust gas into the layered zeolite 22 are provided so that the exhaust gas is used to control temperature of the catalyst to a constant temperature to modify a heavy oil to a light oil.

Numeral 24 denotes a filter, and numeral 25 denotes a combustion gas discharging passage for discharging the combustion gas burned in the combustion chamber 2 to the open air.

That is, as indicated by the arrow of a broken line shown in FIG. 3, the combustion gas burned in the combustion chamber 2 is directed to the open air through the combustion gas discharging passage 25. It warms up the zeolite 22 as a whole within the contact reactor 18 which is provided in the course thereof so as to promote reaction in the contact reactor 18, and is then discharged into the open air.

Further, while the liquefying section 5 may be of a water-cooling type, it is constructed as an air-cooling type for example as shown in FIG. 1, where air is introduced from the lower portion 51 and the air is discharged from the upper portion 52 to liquefy the gas which passes through the liquefying section 5. The liquefied oil is stored in the oil tank 26.

It should be noted that, those gas components which are not liquefied within the oil tank 26 (such as propane and butane) are returned to the interior of the combustion chamber 2 by the gas returning tube 27 through the flashback prevention device 13.

The operation of the waste treatment apparatus 1 will now be described. The outer lid 11 is opened and a hoist or the like (not shown) is used to introduce wastes, such as waste plastics, waste oil, used tires, into the double furnace 9. The outer lid 11 is then closed and the burner 7 is operated to cause a combustion.

A gas is generated from the wastes, as thermal decomposition of the wastes contained in the double furnace 9 takes place due to the combustion by the burner 7. It should be noted that, at this time, a local heating is prevented by uniformly transmitting heat to the wastes without unevenness by means of the double furnace 9.

In the early combustion process within the combustion chamber 2, the second closing valve 17 is closed and the first closing valve 12 is opened by the closing valve control means 19, to direct the gases generated from the wastes (steam, solvent, chlorine gas, etc.) to the combustion chamber 2 through the by-pass passages 6, 6', to prevent mixing of water, solvent, etc. into the oil to be extracted.

In the initial state of the combustion (temperature of the gas discharged from the waste containing chamber 3 being 300° C.~400° C. in the steady state of operation), water, solvents such as acetone, chlorine gas, etc. contained in the wastes are directed to the interior of the combustion chamber 2 through the by-pass passages 6, 6', so that a portion thereof is burned within the combustion chamber 2 and the rest is discharged into the open air through the combustion gas discharging passage 25. It should be noted that it is desirable to direct chlorine to the by-pass passages 6, 6', since it causes a damage on the catalyst in the contact reactor 18.

If contents and amount of the wastes are constant, control of closing/opening by the closing valve control means 19 may be performed on the basis of time in a timer (which is for example 15~20 minutes, though it cannot be indiscriminately said according to types and amount of included substances). Usually, however, the second closing valve 17 is closed and the first closing valve 12 is opened until the temperature sensor 20 detects, for example, 100° C. ~150° C. (preferably 120° C.) in the case where waste oil is the wastes, or 120° C.~200° C. (preferably 150° C.) in the case where waste plastics are the wastes, so that the gas generated from the wastes is directed into the combustion chamber 2 through the by-pass passages 6, 6'. Upon detection of the above described predetermined temperature by the temperature sensor 20, the third closing valve 15 is opened for a fixed time period by a timer. The combustible gas within the by-pass passages 6, 6' is burned in the combustion chamber 2 and is forced out through the combustion gas discharging passage 25 by means of the inert gas such as $CO_2$ or $N_2$ in the cylinder 14. After the fixed time period by the timer, the closing valve control means 19 controls to effect: from open to close of the first closing valve 12; from close to open of the second closing valve 17; and from open to close of the third closing valve 15, to direct the gas generated from the wastes to the gas introduction passage 4. The gas is liquefied at the liquefying section 5 and is stored in the oil tank 26.

At the contact reactor 18, temperature of the catalyst (porous zeolite formed into layers on the wire meshes of a stainless steel) is controlled to a constant temperature by using the combustion gas (for example at about 400° C.), to modify the gas exiting the contact reactor 18 so that, in the cooled state (liquefying section 5), heavy oil is modified to light oil.

It should be noted that those gas components which are not liquefied within the oil tank 26 are returned into the combustion chamber 2 by means of the gas returning tube 27 through the flash back prevention device 13, to be a portion of the heat source as they are burned.

Thereafter, when thermal decomposition of the wastes comes close to its end as time elapses, since temperature of the gas ejected from the waste containing chamber 3 is increased to an extremely high level, the temperature sensor 20 detects such temperature (500° C. for example) to stop operation of the burner 7.

After termination of the thermal decomposition, if the waste containing chamber 3 is opened while it is not cooled, an explosion is caused as the residual combustible gas within the waste containing chamber 3 contacts air. To prevent this, the second gas purge is effected, where the residual combustible gas within the waste containing chamber 3 is forced out by means of an inert gas (such as $CO_2$, $N_2$).

In the second gas purge, operation of the burner 7 is suspended at the time of termination of the thermal decomposition within the combustion chamber 2 and, prior to opening of the outer lid 11, the apparatus is preferably left as it is for a predetermined time period (10 minutes for example) to cause a spontaneous cooling within the waste containing chamber 3 (combustion chamber 2). Then, the third closing valve 15 is opened, and closing of the first closing valve 12 and opening of the second closing valve 17 are effected by the closing valve control means 19. (In some cases, it is possible to open the third closing valve 15 without the spontaneous cooling within the combustion chamber 2.)

The inert gas is directed thorough the gas introduction passage 4, the contact reactor 18, the liquefying section 5, the gas returning tube 27, and to the suction side (by-pass passage 6') of an inlet fan (not shown) of the burner 7.

It should be noted that, in the case of not relying on the above described gas purge, it is also possible to provide the auto-gas discharging valve 40 within the waste containing chamber 3 as shown in FIG. 1. When pressure within the waste containing chamber 3 reaches a predetermined pressure, the auto-gas discharging valve 40 is opened due to the inert gas such as $CO_2$ or $N_2$ in the cylinder 14, so as to discharge the combustible gas within the waste containing chamber 3 to the open air side through the auto-gas discharging valve 40. Further, when a solenoid valve (not shown) is used instead of the auto-gas discharging valve 40, it is also possible to open the solenoid valve to open the waste containing chamber 3 to the open air side.

It should be noted that, while completion of the thermal decomposition has been detected by the temperature sensor 20, it may also be detected by a gas sensor for example by noticing the fact that amount of the gas is decreased as the thermal decomposition of the wastes comes close to its completion.

In the above described embodiment, the waste containing chamber 3 has a disadvantage that a crack occurs in the waste containing chamber 3 due to degradation or the like of the constructing material if it is repeatedly used for many years, where the combustible gas within the waste containing chamber 3 contacts an air to cause an explosion.

An embodiment for mitigating this disadvantage will now be described with reference to FIGS. 4 and 5.

The oil-extracting waste treatment apparatus 1 basically includes: a waste gasification unit 3' in which wastes (not shown) (for example wastes consisting of used tires, rubber, thermoplastic high-molecular compounds, etc.) contained in a waste containing chamber 11 are shut off from air (dry distillation for example at 380°~600° C.) and are heated to generate a combustible gas from the wastes; a contact reactor 18 for the modification from heavy oil to light oil of the combustible gas from the waste gasification unit 3'; a liquefying section 5 for liquefying the combustible gas from the contact reactor 18; and an oil tank 26 for Storing the oil liquefied at the liquefying section 5.

Figure 4:
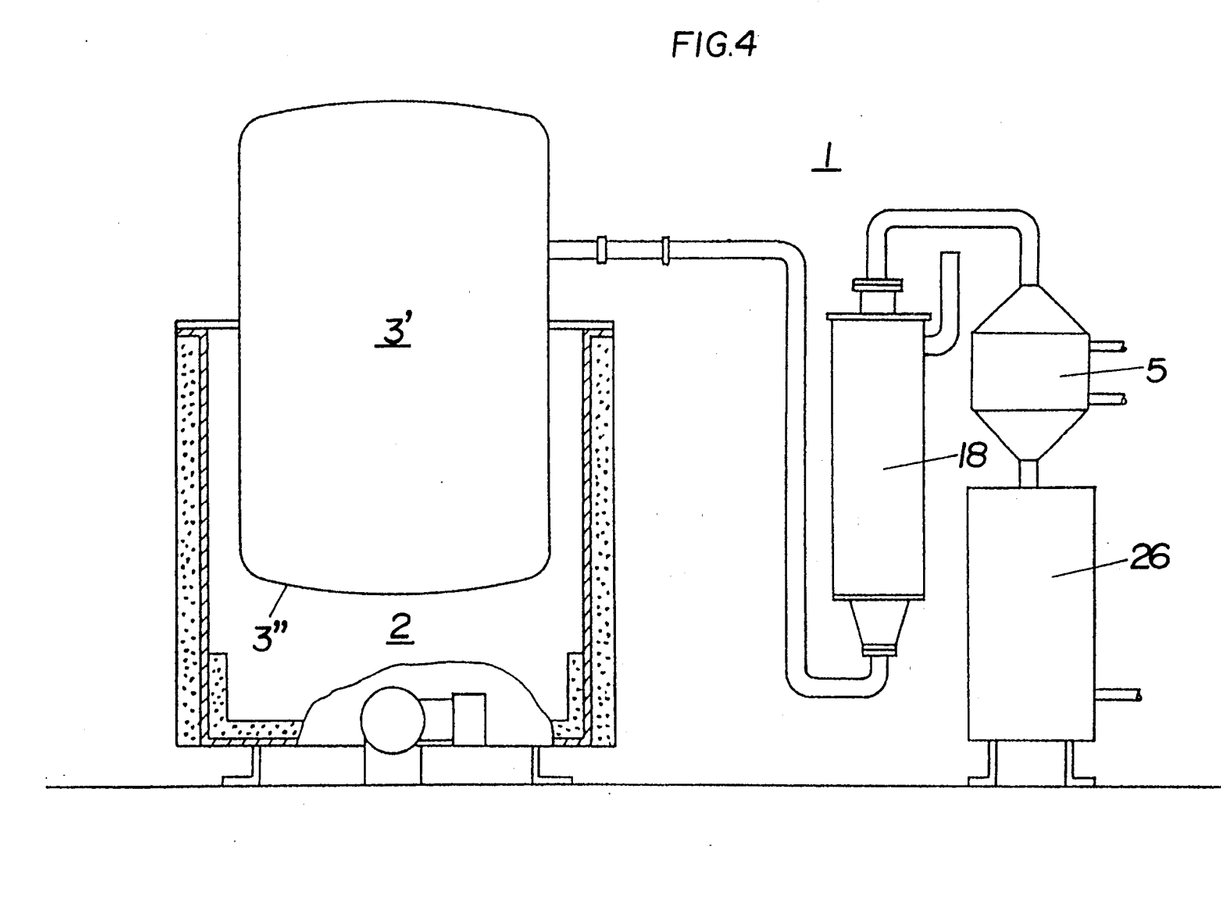
FIG. 4 is a schematic illustration for explaining method and apparatus for oil-extracting treatment of wastes according to an embodiment of the present invention.
Figure 5:
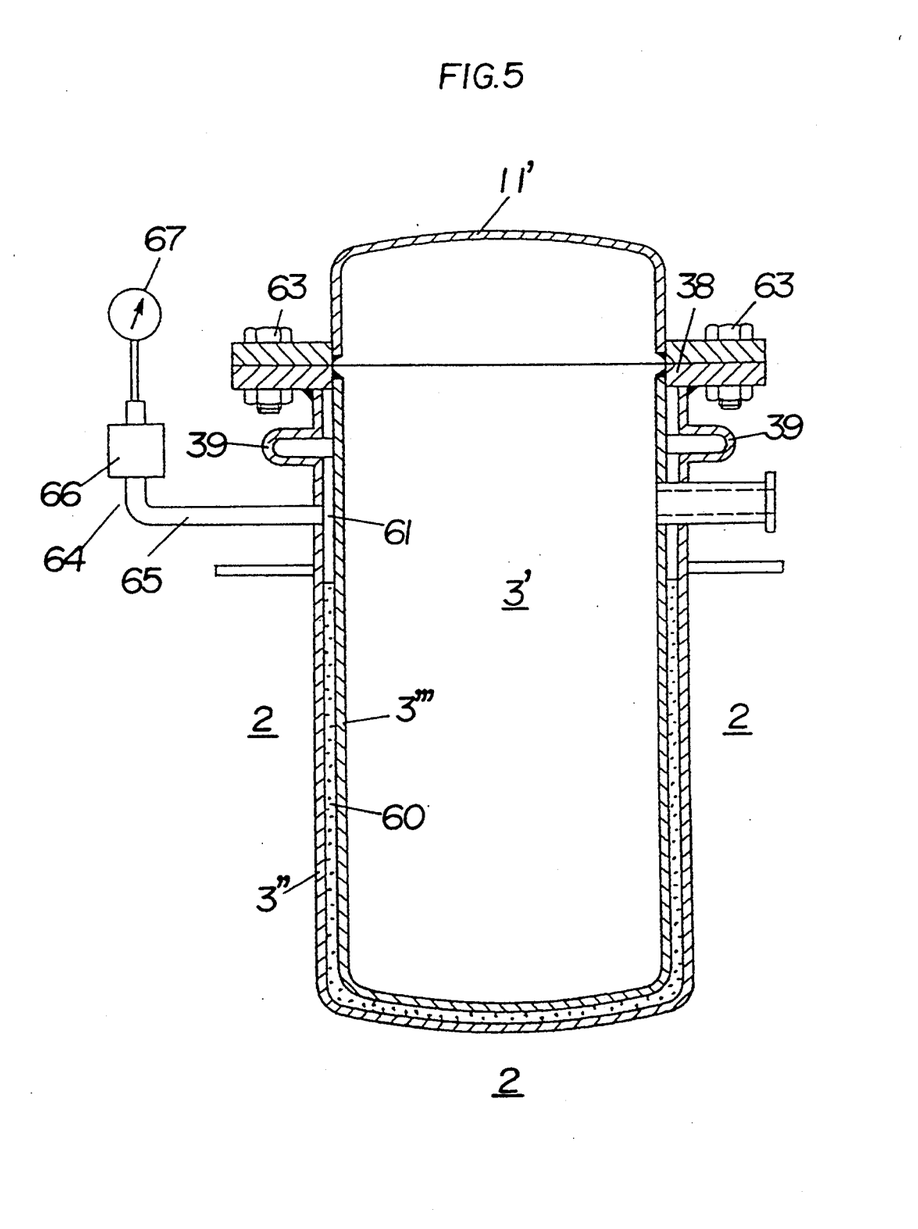
FIG. 5 is a schematic illustration for explaining in detail the oil-extracting waste treatment apparatus as shown in FIG. 4.

As shown in FIG. 4, the waste gasification unit 3' has its outer wall 3" made of a stainless steel provided on the side facing the burning section within the combustion chamber 2. (In FIG. 4, walls or the like covering the combustion chamber 2 are not shown.) Further, fins (not shown) made of a stainless steel is provided at the outer side of the outer wall 3" to improve heat conductivity thereof.

Furthermore, an inner wall 3''' made of a stainless steel is provided at the inner side of the outer wall 3" in a manner separated from the outer wall 3" and contains the wastes (wastes consisting for example of used tires, rubber, or thermoplastic high-molecular compounds (not shown)).

Here, the outer wall 3" and the inner wall 3''' are respectively welded to a flange portion 38 so as to be incorporated into a sealed structure. Further, since the outer wall 3" is subjected to a larger thermal expansion than the inner wall 3''' because it is positioned at the burning side, a thermal expansion absorbing ring 39 for absorbing the thermal expansion is provided at the upper portion of the outer wall 3".

Furthermore, in order to improve thermal conductivity, a heat conducting member 60 formed by mixing fine particles of a heat conductive substance (for example, fine particles of such metals as copper or iron) and heat resisting adhesives (such as $AlO_3.SiO_2$) is provided between the outer wall 3" and the inner wall 3''', and a fluid (such as air) is sealed within the portion (denoted by numeral 61) above the heat conducting member 60.

It should be noted that fine particles of a heat conductive substance is contained in the heat conducting member 60, since heat conductivity is inferior only with the heat resisting adhesives (such as $AlO_3.SiO_2$). Further, if the heat conducting member 60 is adhered to both the outer wall 3" and the inner wall 3''', a crack occurs on the heat conducting member 60 due to the thermal expansion differential between the outer wall 3" and the inner wall 3''', causing a reduction in the heat conductivity of the heat conducting member 60. For this reason, the heat conducting member 60 is bonded to only one of the outer wall 3" and the inner wall 3'''. An antiadhesive agent such as liquid teflon is applied on the side not bonded (the outer wall 3" or the inner wall 3''' which is not bonded) to prevent adhesion of the heat conducting member 60 thereto. It should be noted that, instead of the one described above, one containing tin and copper at a ratio by weight of 1:1 may be used as the heat conducting member 60.

Further, numeral 11' denotes a closing lid, where the closing lid 11' is opened to introduce wastes (not shown) (for example wastes of used tires, rubber or thermoplastic high-molecular compounds) into the inside of the inner wall 3''' and it is tightened by bolts 63 or the like to be fixed. Numeral 64 denotes pressure detection means, where the pressure detection means 64 (for example, employing a pressure gauge so that value of the pressure may be readily read by checking the reading of the pressure gauge) is capable of detecting pressure of the fluid existing between the inner wall 3''' and the outer wall 3".

The pressure detection means 64 includes: a tube 65 which is in communication with the fluid (denoted by numeral 61) at the portion above the heat conducting member 60 between the outer wall 3" and the inner wall 3'''; an air chamber (air chamber) 66 provided in the course of the tube 65 to mitigate pressure rise; and a pressure gauge 67 provided at the terminal end side thereof.

Accordingly, the pressure detection means 64 of the waste gasification unit 3' detects a value of an increased pressure as combustion in the combustion chamber 2 takes place. If, however, the inner wall 3''' or the outer wall 3" is broken, the pressure of the fluid existing between the inner wall 3''' and the outer wall 3" does not indicate an increased value.

As a result, it is possible to detect a breakage on the inner wall 3''' or the outer wall 3" by a pressure change of the fluid existing between the inner wall 3''' and the outer wall 3".

Further, even though the inner wall 3''' and the outer wall 3" are subject to thermal expansion as combustion takes place in the combustion chamber 2, the side of the heat conducting member 60 which is not bonded is not restricted but is merely slid while retaining its heat conductivity, since it is bonded to only one of the outer wall 3" or the inner wall 3'''. Thus, occurrence of a crack due to the thermal expansion differential between the outer wall 3" and the inner wall 3''' is prevented.

As a result, according to a method for oil-extracting treatment of wastes of the present invention, the wastes contained in a waste containing chamber is shut off from air and is heated to extract oil, an inert gas is injected into the waste containing chamber after termination of the thermal decomposition of the wastes to force out the combustible gas within said waste containing chamber and, then, said waste containing chamber is opened. It is thus possible to prevent an explosion which has conventionally been caused to occur due to mixing of the residual combustible gas within the waste containing chamber and air.

Further, according to a method of oil-extracting treatment of wastes of the present invention, the wastes contained in a waste containing chamber is shut off from air and is heated to extract oil, and the waste containing chamber is constructed to have an outer wall facing a combustion side and an inner wall which is provided at the inside of the outer wall in a manner separated from said outer wall and which contains said wastes, so that breakage of the inner wall or the outer wall is detected by pressure change of a fluid existing between the inner wall and the outer wall. It is thus possible to previously prevent an explosion which occurs as the combustible gas within the inner wall contacts an air due to a breakage of the inner wall or the outer wall.

Furthermore, a waste gasification apparatus is provided in accordance with the present invention, the waste gasification apparatus being constructed such that wastes contained in a waste containing chamber is shut off from air and is heated to generate a combustible gas from the wastes, comprising: a combustion chamber; an outer wall provided within the combustion chamber in a manner facing the combustion side; an inner wall which is provided at the inside of the outer wall in a manner separated from said outer wall and which contains the wastes; and a pressure detection means for detecting pressure of a fluid existing between said inner wall and said outer wall. It is thus possible to previously prevent an explosion which occurs as the combustible gas within the inner wall contacts air due to a breakage of the inner wall or the outer wall.

What is claimed is:

1. A method of oil-extracting treatment of wastes for extracting oil comprising, preparing a system including a waste containing chamber for receiving wastes, a combustion chamber for heating the waste containing chamber to change the wastes to waste gas, and means for recovering the waste gas, burning a material in the combustion chamber to heat the wastes in the waste containing chamber to obtain initial waste gas, said initial waste gas being supplied to the combustion chamber to burn the same without supplying to the recovery means, supplying an inert gas to the waste containing chamber to remove the initial waste gas therefrom and burning the initial waste gas at the combustion chamber, providing the waste gas to the recovering means for recovering oil from the waste gas after the initial waste gas is removed, supplying the inert gas to the waste containing chamber after termination of generation of the waste gas to remove the waste gas from the waste containing chamber, and opening the waste containing chamber.

2. A method according to claim 1, wherein said recovering means includes a contact reactor heated at constant temperature by a gas exhausted from the combustion chamber.

3. A method according to claim 2, wherein said waste containing chamber includes a double furnace to uniformly heat the wastes in the waste containing chamber.

4. A method according to claim 3, wherein said waste containing chamber includes an auto-gas discharging valve, said discharging valve being opened by pressure of the inert gas supplied to the waste containing chamber to thereby force out the waste gas in the waste containing chamber to atmosphere through the auto-gas discharge valve.

5. A method according to claim 3, wherein said waste containing chamber includes a solenoid valve, said solenoid valve being opened after supplying the inert gas to the waste containing chamber to thereby force out the waste gas to atmosphere through the solenoid valve.

6. A method according to claim 1, further comprising suspending heating of the waste containing chamber and cooling the same before a second time of supplying the inert gas to the waste containing chamber.

7. A method according to claim 3, wherein said double furnace includes an outer wall, an inner wall inside the outer wall, a space between the outer and inner walls, and means for detecting pressure in the space for detecting breakage of the inner and outer walls.

8. A method according to claim 7, wherein said double furnace further includes heat conducting member situated in a part of the space.

9. A method according to claim 8, wherein said detecting means includes a tube connected to the space at one end, an air chamber provided in a middle of the tube for regulating pressure, and a pressure gauge provided at the other end of the tube.

* * * * *